United States Patent [19]

Jennings, Jr.

[11] Patent Number: 4,807,703
[45] Date of Patent: Feb. 28, 1989

[54] FRACTURE ACIDIZING SANDSTONE FORMATIONS

[75] Inventor: Alfred R. Jennings, Jr., Plano, Tex.

[73] Assignee: Mobil Oil Corporation, New York, N.Y.

[21] Appl. No.: 87,561

[22] Filed: Aug. 19, 1987

[51] Int. Cl.⁴ .................. E21B 43/26; E21B 43/27
[52] U.S. Cl. ................................ 166/307; 166/308
[58] Field of Search ............ 166/307, 308, 271, 282, 166/281; 252/8.553

[56] References Cited

U.S. PATENT DOCUMENTS

| | | | |
|---|---|---|---|
| 3,167,123 | 1/1965 | Graham et al. | 166/307 UX |
| 4,044,833 | 8/1977 | Volz | 166/307 |
| 4,237,975 | 12/1980 | Scherubel | 166/308 X |
| 4,453,596 | 6/1984 | Conway et al. | 166/308 X |
| 4,466,893 | 8/1984 | Dill | 166/307 X |
| 4,683,068 | 7/1987 | Kucera | 166/308 X |

*Primary Examiner*—Stephen J. Novosad
*Attorney, Agent, or Firm*—Alexander J. McKillop; Charles J. Speciale; Charles A. Malone

[57] ABSTRACT

A process for acid treating a formation where a gelled and foamed acid pre-flush solution is utilized. Said pre-flush is injected into the formation under conditions and pressures sufficient to fracture said formation. Thereafter, a foamed acid solution is directed into the gelled and foamed acid pad. The resultant viscosity contrast causes the foamed acid to "finger" through said pad and unevenly etch the fracture face. "Fingering" of the foamed acid through said pad causes it to propagate substantially further into the formation than with existing sandstone acidizing processes.

15 Claims, 1 Drawing Sheet

FRACTURE ACIDIZING SANDSTONE FORMATIONS

FIELD OF THE INVENTION

This invention is related to methods for acidizing a sandstone formation to increase its permeability or to reduce damage.

BACKGROUND OF THE INVENTION

In many instances it is desirable to stimulate a hydrocarbon producing interval to improve productivity or to remove damage. Several means are available to accomplish the desired stimulation. In carbonate formations such as limestone and dolomite, hydrochloric acid and certain organic acids (e.g. formic, acetic, and oxalic) have been very useful in etching channels, dissolving formation materials in pore spaces, and improving well productivity.

In sandstone formations, HCl/HF acid formulations have been used to remove wellbore damage. This method of damage removal is highly dependent upon the reactivity of HF acid on silicates (especially drilling mud residue and formation clays). HF acid, however, has two characteristics which limit its application. Firstly, HF is very reactive and spends quickly on clays and quartz particles in the sandstone matrix. Secondly, HF can provide reactant by-products such as fluorosilicates and calcium fluoride precipitates which can cause severe formation damage. This damage is not readily removable by chemical means. To limit the side reactions, a pre-flush of HCl is typically pumped into the formation ahead of the HCl/HF fluid. The HCl pre-flush reacts with any acid soluble calcium or magnesium minerals (calcite and dolomite, in particular) in the sandstone prior to the arrival of the HCl/HF acid. The HCl component of HCl/HF acid also helps keep the pH of the spent HF acid low which also helps prevent precipitation of HF reactant by-products.

Therefore, what is needed is a method for acidizing a formation where the acid utilized maintains its strength while avoiding the buildup of harmful precipitates and thereby allows for greater penetration into the formation than heretofore possible.

SUMMARY OF THE INVENTION

This invention is directed to a method for treating a subterranean formation to improve permeability therein. In carrying out this invention, a gelled and foamed acid is directed into the formation as a pre-flush under conditions and pressures sufficient to fracture said formation. After creating fractures in the formation, an ungelled and foamed acid is directed into said fractures. The viscosity contrast resultant from ungelled and foamed acid "fingering" through the gelled and foamed acid unevenly etches the fracture face causing the acid to propagate substantially further into the formation.

It is therefore an object of this invention to cause acid to contact more area in the formation than is presently possible.

It is another object of this invention to provide for a method where the foam will have better fluid loss control properties thereby allowing greater penetration of acid.

It is yet another object of this invention to cause "fingering" to occur in the fractures thereby causing acid to penetrate substantially further in a formation than presently possible.

It is still another object of this invention to provide for an efficient clean up after fracturing due to gases generated by the acids.

DESCRIPTION OF THE PREFERRED EMBODIMENTS

Figure 1:
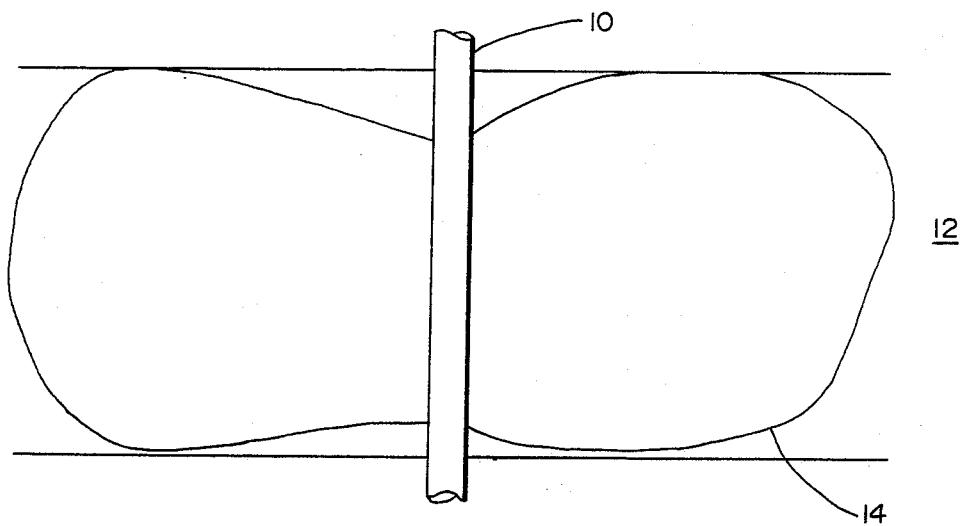
FIG. 1 is a schematic drawing which depicts fractures created by a pre-flush.

In the practice of this invention, referring to FIG. 1, a gelled and foamed acid pre-flush solution is injected into well 10 which penetrates formation 12. Said solution is subjected to pressures and conditions sufficient to fracture the formation thereby initiating fractures. These fractures can be initiated by various methods known to those skilled in the art. A hydraulic fracturing technique is disclosed by Savins in U.S. Pat. No. 4,067,389 which issued on Jan. 10, 1978. This patent is hereby incorporated by reference. A radial fracturing method is described by Godfrey et al. in U.S. Pat. No. 4,039,030 which issued on Aug. 2, 1977. This patent is also incorporated by reference.

After creating the fractures 14, an ungelled and foamed acid solution is injected into well 10 and into the fractures 14. Depending on the fracturing method used, the fractures may appear as shown in FIG. 1. The ungelled and foamed acid solution upon entering the fractures 14 "fingers" through the gelled foam pad previously created by the gelled and foamed acid pre-flush solution. This "fingering" is a result of the viscosity contrast between the pre-flush solution and the ungelled and foamed acid solution subsequently injected. As the ungelled and foamed acid solution "fingers" through the gelled foam, it unevenly etches the fracture face. In this manner it propagates substantially farther into the formation than previously possible. This method is particularly beneficial when utilized in sandstone formations.

A method for making a gelled and foamed acid solution which can be utilized herein is described in U.S. Pat. No. 4,324,669 issued to Norman et al. on Apr. 13, 1982. This patent is hereby incorporated by reference. The gelling agent used in accordance with the present invention also functions as a foaming agent and is easily dispersed into an aqueous acid solution prior to foaming the solution. A small quantity of the agent rapidly increases the viscosity of the acid solution with a minimum of mixing and agitation. After foaming, the resulting foamed and gelled aqueous acid solution has excellent stability, high viscosity and low fluid loss over a broad temperature range, has reduced pumping friction pressure, is relatively non-damaging to subterranean formations treated therewith, and, upon becoming spent in subterranean formations, and, without the inclusion of chemical breakers or special additives therein, breaks to a low viscosity liquid having excellent fines suspension properties.

The gelling agent which also functions as a foaming agent of this invention is comprised of a solution of a water soluble organic solvent and an ethoxylated fatty amine.

Mixtures of ethoxylated tertiary fatty amines derived from fats and oils such as coconut oil, soy bean oil, and tallow are particularly suitable for use in accordance with the present invention.

Other examples of such amines are those derived from fatty acids of the type hexadecyl, oleyl, and either saturated or unsaturated and either as pure components or mixtures.

A variety of organic solvents can be utilized in making the gelling agents so long as such solvents are capable of dissolving the ethoxylated fatty amines and are also water soluble. Examples of such water soluble organic solvents include alkanols having in the range of about 1 to 5 carbon atoms per molecule, such as methanol, ethanol, isopropanol and t-butanol; ketones having in the range of about 3 to 6 carbon atoms per molecule, such as acetone and methylethyl ketone; polyhydroxy compounds having in the range of about 2 to 6 carbon atoms per molecule, such as ethylene glycol and glycerine; ethers having in the range of about 2 to 6 carbon atoms per molecule, such as dioxane and tetrahydrofuran; compounds containing both ether and alcohol functions having in the range of about 4 to 3 carbon atoms per molecule, such as diethylene glycol and triethylene glycol; organic acids having in the range of about 1 to 10 carbon atoms per molecule, such as formic acid, malonic acid, acetic acid, gluconic acid, levulinic acid and propionic acid; esters having in the range of about 2 to 6 carbon atoms per molecule, such as methyl formate, dimethyl oxylate and dimethyl malonate; and lactones having in the range of about 3 to 5 carbon atoms per molecule, such as beta-propyl lactone and gamma-butyl lactone. due to the density low freezing point and/or high flash point (tag closed cup) of the resulting gelling agent the organic acids are preferred with acetic acid being the most preferred.

The water soluble organic solvent useful herein is preferably in liquid phase at the temperature at which it is mixed with the ethoxylated fatty amine. Furthermore, mixtures of the organic solvents can be used. An example is a mixture of methanol and gluconic acid.

The gelling-foaming agent useful herein can be prepared by mixing the water soluble organic solvent with the ethoxylated fatty amine for a period of time sufficient to completely dissolve the amine in the solvent. The quantity of ethoxylated amine dissolved in the solvent can range in an amount of from about 10 to about 80, preferably from about 50 to about 60 percent amine by the weight of solution.

As mentioned above, the organic solvents can be used singly, or in mixtures of solvents of the same chemical class (acids with acids, ketones with ketones and the like) or in mixtures of solvents of different chemical classes (acids with alcohols, ethers with ketones and the like). A preferred organic solvent is a mixture of chemicals of different chemical classes wherein at least one of the classes is an organic acid.

Ethoxylated fatty amines useful herein are very difficult to dissolve directly in aqueous inorganic acid solutions. However, a solution of the amines dissolved in a water soluble organic solvent, such as acetic acid, readily dissolves in an aqueous inorganic acid solution and substantially immediately increases the viscosity of the acid solution.

The gelling-foaming agent of the present invention causes an increase in the viscosity of aqueous inorganic acid solutions having acid concentrations in the range of from about 1 to about 25 percent active acid by weight of the solutions. However, acid solutions having acid concentrations of greater than about 25 percent can be mixed with the gelling agent of this invention and such acid solutions, upon being reacted, will begin to exhibit a noticeable increase in viscosity when the acid concentration, due to the reaction, is diminished to a value of about 25 percent. Such increase in viscosity continues with continued decrease in acid concentration until the acid concentration reaches a value in the range of from about 10 percent to about 15 percent. To this extent then, the gelling-foaming agent brings about a delayed gelling characteristic.

The gelling-foaming agent of this invention will cause the viscosity of aqueous inorganic acid solutions having acid concentrations in the range of from about 1 to about 10 percent, and more particularly, in the range of from about 1 to about 5 percent, to rapidly increase providing that the presence of dissolved salts in the acid solution is very low and preferably absent. In this connection, the presence of dissolved salts in the gelled acids cause the gels to break when the acid concentration is less than about 10 percent and particularly when the acid concentration is less than about 5 percent. This breaking feature, as will be further explained below, can be of particular value when the foamed acid gels of this invention are used to acid treat subterranean formations.

The gelling-foaming agent is particularly useful in increasing the viscosity and foaming aqueous inorganic acid solutions such as hydrochloric acid solutions, sulfuric acid solutions, phosphoric acid solutions, hydrofluoric acid solutions and solutions containing mixtures of such acids.

In preparing a gelled and foamed aqueous acid solution of this invention, the acid of mixture of acids utilized can be, and are preferably, diluted with water to obtain an aqueous inorganic acid solution of desired acid concentration. A gelling-foaming agent, i.e., an ethoxylated fatty amine or mixture of such amines of the type described above dissolved in a water soluble organic solvent, is preferably combined with the aqueous acid solution in an amount in the range of from about 0.1 to about 10, and more preferably in the range of from about 2 to 6 percent gelling agent by weight of the aqueous acid solution. The acid solution and gelling agent are agitated or mixed for a short period of time whereupon the viscosity of the aqueous acid solution is increased. More specifically, some increase in viscosity is obtained when as little as 0.1 percent gelling agent is combined with the aqueous acid solution, and greater amounts of the gelling agent bring about increased viscosity. When the gelling agent is combined with the aqueous acid solution in an amount of about 10 percent by weight of the solution, viscosities of about 150 centipoises can be obtained.

Greater viscosity increase can be obtained through use of gelling agent amounts in excess of 10 percent. Thus, 10 percent is not a limit on the capability of the gelling agent to increase the viscosity of acid, but is viewed as a working guide in view of current process economics and the practical capabilities of currently known liquid handling and pumping equipment. After the viscosity of the aqueous acid solution has been increased by the gelling agent, an inert gas such as carbon dioxide or nitrogen is injected into the gelled acid to produce the gelled and foamed aqueous acid solution of this invention. The injection of the inert gas and foaming of the gelled acid solution can be accomplished in a variety of ways well known to those skilled in the art, all of which bring about a very thorough mixing of the gas with the acid solution. A preferred method is to simply pump the inert gas and gelled acid solutions at high velocities into a T connection whereby high shear and mixing are produced. the quantity of inert gas required depends upon the degree of foaming or quality of foam desired, the pressure at which the gas injected into the gelled acid solution and other factors. Generally a quantity of inert gas in the range of from about 10 to about 1000 standard cubic feet per gallon of gelled acid solution produces a foam of a quality in the range of from about 50 to 90. Foam quality as used herein is defined as the ratio of gas volume to the total volume of foam times 100.

A gelled and foamed aqueous acid solution of this invention is comprised of water, a water soluble inorganic acid or mixture of such acids, a gelling agent comprised of a solution of a water soluble organic solvent and an ethoxylated fatty amine.

Although ethoxylated fatty amines have been designated as the gelling agent of choice, other gelling agents can be utilized. Other gelling agents which can be utilized include available polymers, e.g., guar, hydroxypropyl guar, hydroxyethyl cellulose, carboxylmethylhydroxyethyl cellulose, Xanthan gum, and polyacrylamide. When these polymers are utilized, about 0.3 wt.% to about 0.9 wt.% polymer by weight of acid can be utilized.

Another method for making gelled acidic composition is disclosed in U.S. Pat. No. 4,240,505 which issued to Swanson on Dec. 23, 1980. This patent is hereby incorporated by reference herein.

A base gel could also comprise any of the commercially available crosslinked gelled acids prepared. Several of these acids are prepared from hydroxypropyl guar or carbomethyl cellulose and crosslinked with a solution of a transitional metal ion, e.g., zirconium, aluminum, or titanium. This tansitional metal ion crosslinker should be in a concentration of about 0.01 to about 1.0 weight percent.

A foaming agent, e.g., a sulfonate or phosphonate is added to the base gel in a concentration of about 0.1% to about 1.0% by volume.

As mentioned above, foam could be generated by using an inert gas, e.g., nitrogen, carbon dioxide, methane, or air. To generate foam, inert gas can be directed into the acid in about 50% to about 90% by volume. Foaming and gelling the acid improves the efficiency of the pre-flush by allowing the acid to travel deeper into the created fractures where it reacts with minerals along the fracture face which are detrimental to the acid treatment. The gelled and foamed pre-flush would then be followed by the ungelled and foamed acid.

Figure 2:
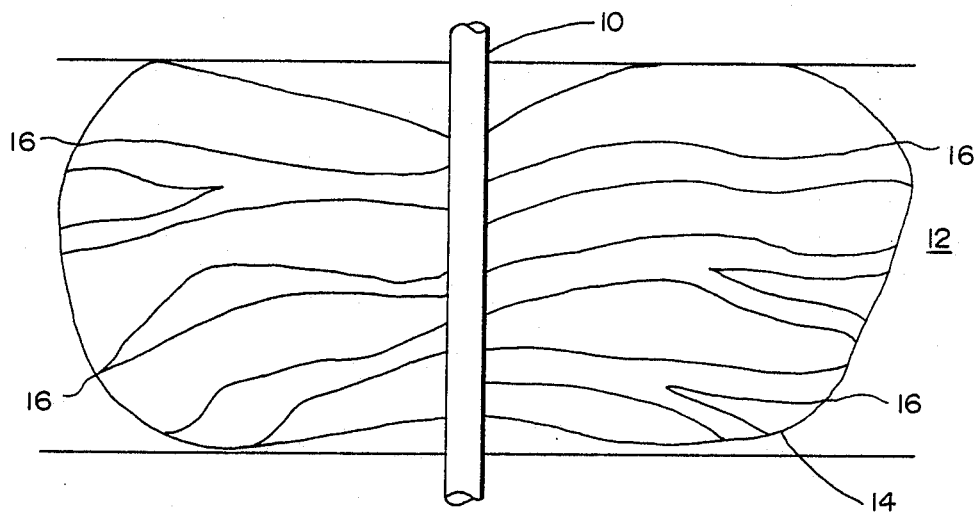
FIG. 2 is a schematic drawing which depicts "fingering" of the foamed acid in the gelled foam pad within the fractures.

An ungelled foamed acid can be made by omitting the base gel from the acid. Any of the acids above mentioned can be used in this step. Foaming can also be accomplished by using the procedure above mentioned for foaming the gelled acid. After the acid has been foamed it is injected into the formation 12 via well 10 as shown in FIG. 2. Once inside fracture 14, this ungelled foamed acid "fingers" through the fracture 14 containing the gelled foam pad where it unevenly etches the fracture face thereby propagating substantially further into the formation. Said propagation and etching is particularly beneficial when this method is carried out in a sandstone formation. When the acid is spent and the desired amount of etching and fracturing obtained, the gelled composition is removed from the formation. Thereafter, hydrocarbonaceous fluids are produced from the formation.

Where it is desired to prop the created fractures, propping agents can be included in the gelled acidic composition. Propping agents which can be used include sand grains, walnut shell fragments, tempered glass beads, pellets, sintered bauxite and similar materials so long as they are compatible with the gelled and foamed acidic compositions utilized herein. The particle size of said agents should be about 20 to about 100 mesh (U.S. Sieve Series) preferably about 8 to about 40 mesh.

Obviously, many other variations and modifications of this invention, as previously set forth, may be made without departing from the spirit and scope of this invention as those skilled in the art will readily understand. Such variations and modifications are considered part of this invention and within the purview and scope of the appended claims.

What is claimed is:

1. A method for acid treating a subterranean formation comprising:
   (a) injecting a gelled and foamed acid into a formation under conditions and pressures sufficient to fracture said formation and create a foam pad in the face of at least one resultant fracture; and
   (b) thereafter, injecting into said fracture an ungelled and foamed acid which acid "fingers" through said foam pad thereby unevenly etching said fracture and propagating to substantially further distances into said formation.

2. The method as recited in claim 1 wherein propping agents are included in said gelled and foamed acid prior to injecting said acid into said formation.

3. The method as recited in claim 1 where said formation is sandstone.

4. The method as recited in claim 1 where in step (a) said gelled and foamed acid comprises an inorganic acid; water; an inert gas; a gel-foaming agent; and a water soluble gelled polymer selected from a member of the group consisting of guar, hydroxypropyl guar, hydroxyethylcellulose, Xanthan gum and polyacrylamide.

5. The method as recited in claim 1 where in step (a) said gelled and foamed acid comprises an inorganic acid; water; an inert gas; a gel-foaming agent; and a water soluble gelled polymer selected from a member of the group consisting of guar, hydroxypropyl guar, hydroxyethylcellulose, Xanthan gum and polyacrylamide; and a water soluble gelled polymer selected from hydroxypropyl guar or carbomethyl cellulose crosslinked with a transitional metal ion crosslinker.

6. A method for acid treating a subterranean formation comprising:
   (a) injecting a gelled and foamed acid into a formation under conditions and pressures sufficient to fracture said formation and create a foam pad in the face of at least one resultant fracture;
   (b) thereafter, injecting into said fracture an ungelled and foamed acid which acid "fingers" through said foam pad thereby unevenly etching said fracture and propagating to substantially further distances into said formation;
   (c) removing the gelled acid from the formation; and
   (d) producing hydrocarbonaceous fluids from said formation.

7. The method as recited in claim 6 wherein propping agents are included in said gelled and foamed acid prior to injecting said acid into said formation.

8. The method as recited in claim 6 where said formation is sandstone.

9. The method as recited in claim 6 where in step (a) said gelled and foamed acid comprises an inorganic acid; water; an inert gas; a gel-foaming agent; and a water soluble gelled polymer selected from a member of the group consisting of guar, hydroxypropyl guar, hydroxyethylcellulose, Xanthan gum and polyacrylamide.

10. The method as recited in claim 6 where in step (a) said gelled and foamed acid comprises an inorganic acid; water; an inert gas; a gel-foaming agent; and a water soluble gelled polymer selected from a member of the group consisting of guar, hydroxypropyl guar, hydroxyethylcellulose, Xanthan gum and polyacrylamide; and a water soluble gelled polymer selected from hydroxypropyl guar or carbomethyl cellulose crosslinked with a transitional metal ion crosslinker.

11. A method for acid treating a sandstone formation comprising:
 (a) injecting a gelled and foamed hydrofluoric acid pre-flush into a formation under conditions and pressures sufficient to fracture said formation and create a foam pad in the face of at least one resultant fracture; and
 (b) thereafter, injecting into said fracture an ungelled and foamed hydrochloric/hydrofluoric acid mixture which acid "fingers" through said foam pad thereby unevenly etching said fracture and propagating to substantially further distances into said formation.

12. The method as recited in claim 11 wherein propping agents are included in said gelled and foamed acid prior to injecting said acid into said formation.

13. The method as recited in claim 11 where in step (a) said gelled and foamed acid comprises an inorganic acid; water; an inert gas; a gel-foaming agent; and a water soluble gelled polymer selected from a member of the group consisting of guar, hydroxypropyl guar, hydroxyethylcellulose, Xanthan gum and polyacrylamide.

14. The method as recited in claim 11 where in step (a) said gelled and foamed acid comprises an inorganic acid; water; an inert gas; a gel-foaming agent; and a water soluble gelled polymer selected from a member of the group consisting of guar, hydroxypropyl guar, hydroxyethylcellulose, Xanthan gum and polyacrylamide; and a water soluble gelled polymer selected from hydroxypropyl guar or carboxymethyl cellulose crosslinked with a transitional metal ion crosslinker.

15. The method as recited in claim 11 where after step (b) gelled acid is removed from the formation and hydrocarbonaceous fluids are produced therefrom.

* * * * *